United States Patent [19]
Riedel et al.

[11] Patent Number: 6,010,149
[45] Date of Patent: Jan. 4, 2000

[54] AIR-BAG ARRANGEMENT

[75] Inventors: Johannes Riedel; Rainer Wunsch, both of Munich, Germany

[73] Assignee: Autoliv Development AB, Vargarda, Sweden

[21] Appl. No.: 09/058,226

[22] Filed: Apr. 10, 1998

[30] Foreign Application Priority Data

Apr. 11, 1997 [GB] United Kingdom .................. 9707360

[51] Int. Cl.[7] ............................ B60R 21/16; B60R 21/22
[52] U.S. Cl. .................. 280/730.2; 280/729; 280/743.1; 280/743.2
[58] Field of Search ............................... 280/730.2, 729, 280/730.1, 743.1, 743.2, 733

[56] References Cited

U.S. PATENT DOCUMENTS

| | | | |
|---|---|---|---|
| 5,322,322 | 6/1994 | Bark et al. | 280/730 |
| 5,480,181 | 1/1996 | Bark et al. | 280/730.2 |
| 5,588,672 | 12/1996 | Karlow et al. | 280/730.2 |
| 5,765,869 | 6/1998 | Huber | 280/733 |
| 5,788,270 | 8/1998 | Håland et al. | 280/729 |

FOREIGN PATENT DOCUMENTS

| | | |
|---|---|---|
| 1349097 | 3/1974 | United Kingdom . |
| 2297950 | 8/1996 | United Kingdom . |

*Primary Examiner*—Lanna Mai
*Assistant Examiner*—Jason S. Brooks
*Attorney, Agent, or Firm*—Venable; George H. Spencer; Catherine M. Voorhees

[57] ABSTRACT

An air-bag arrangement for a motor vehicle, the air-bag arrangement including an air-bag adapted to be inflated, in the event that an accident should arise, to form a curtain, the air-bag having a fixation strap extending between the curtain and an anchor point, the fixation strap including inflatable means to shorten the effective length of the fixation strap upon inflation.

17 Claims, 7 Drawing Sheets

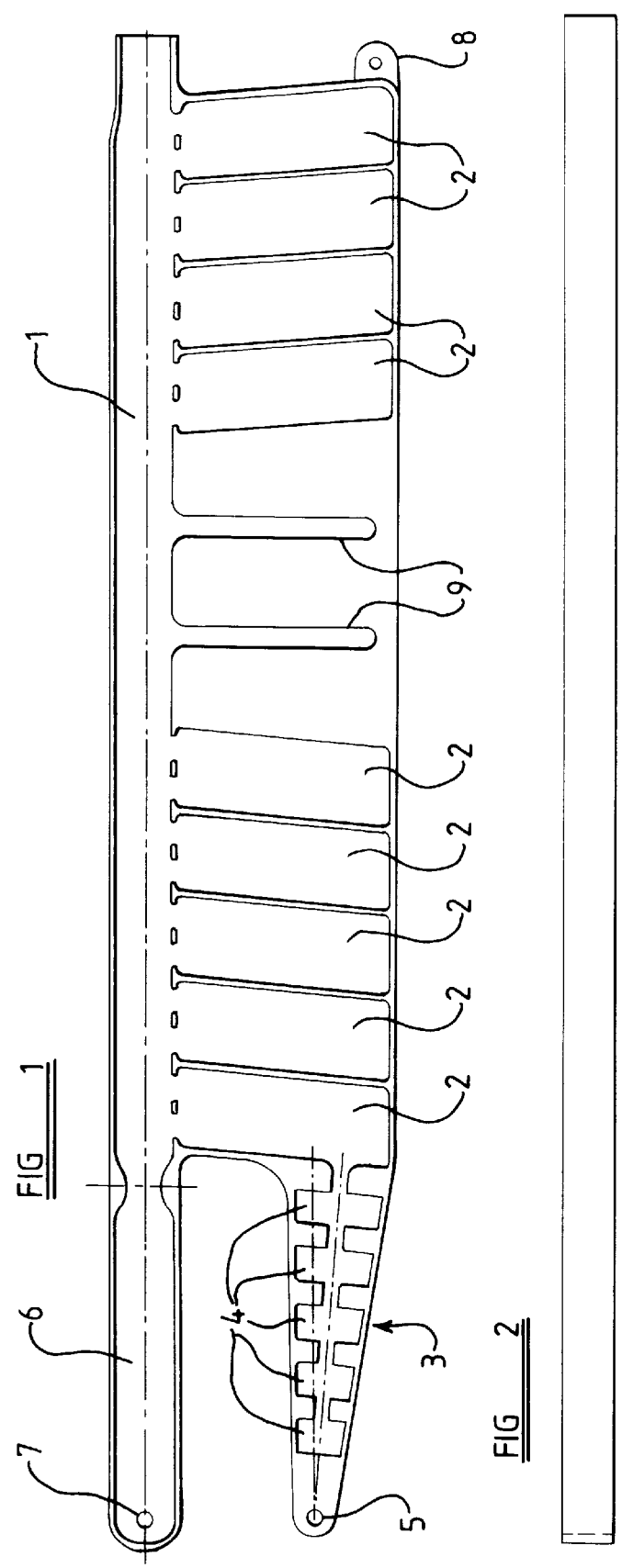

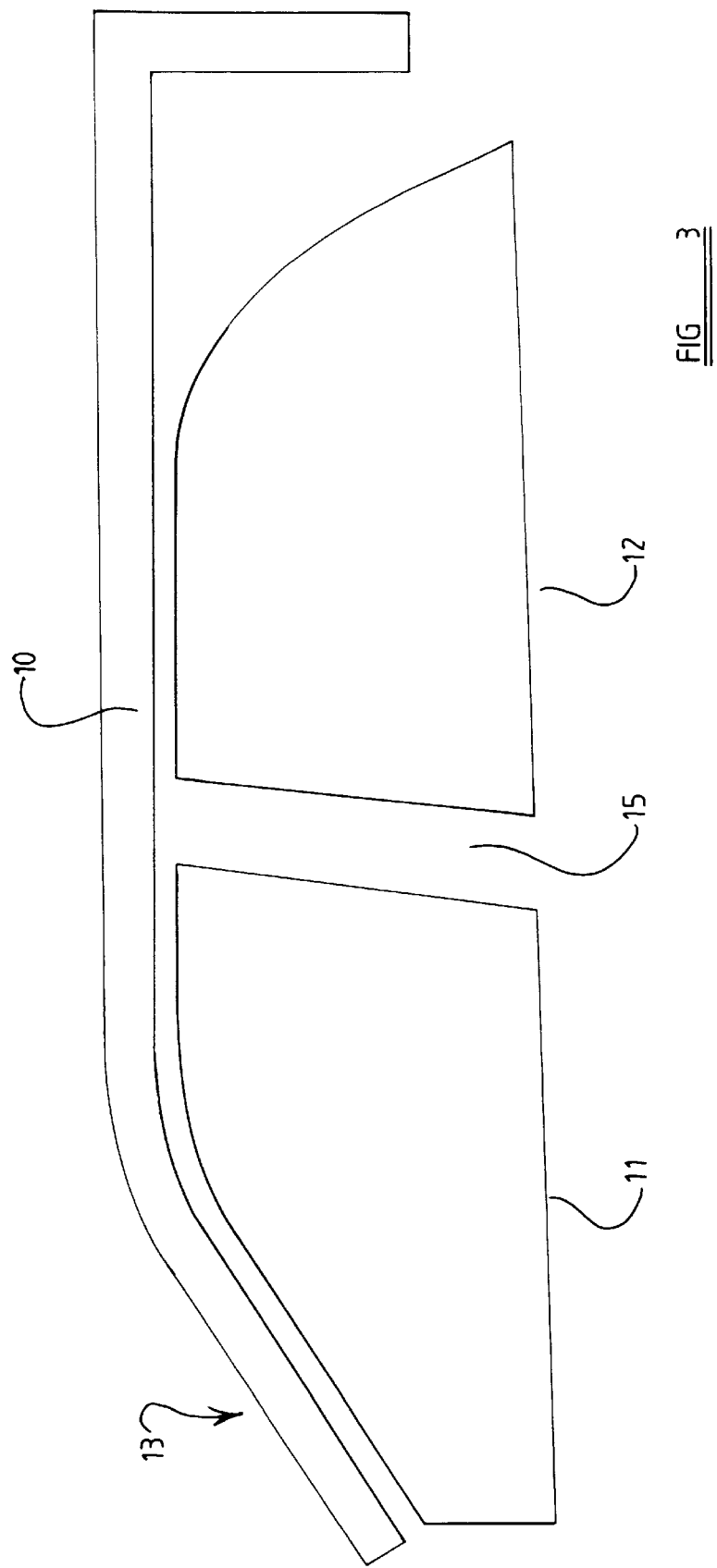

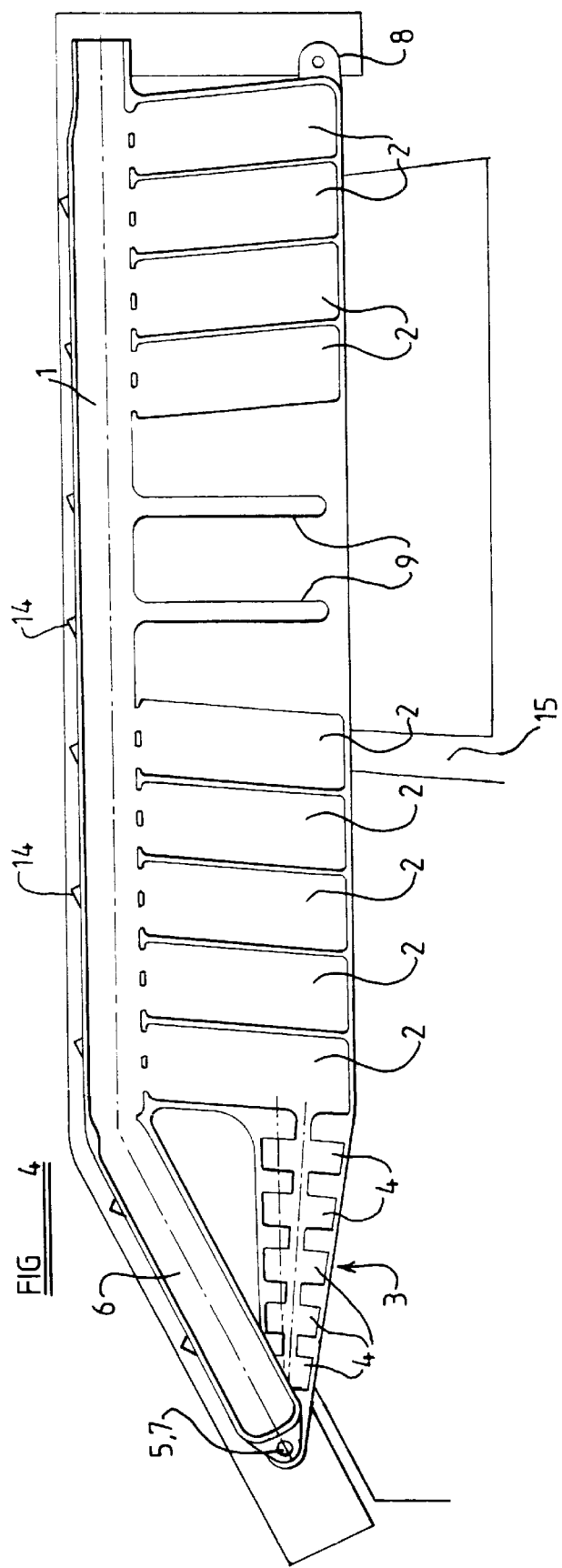

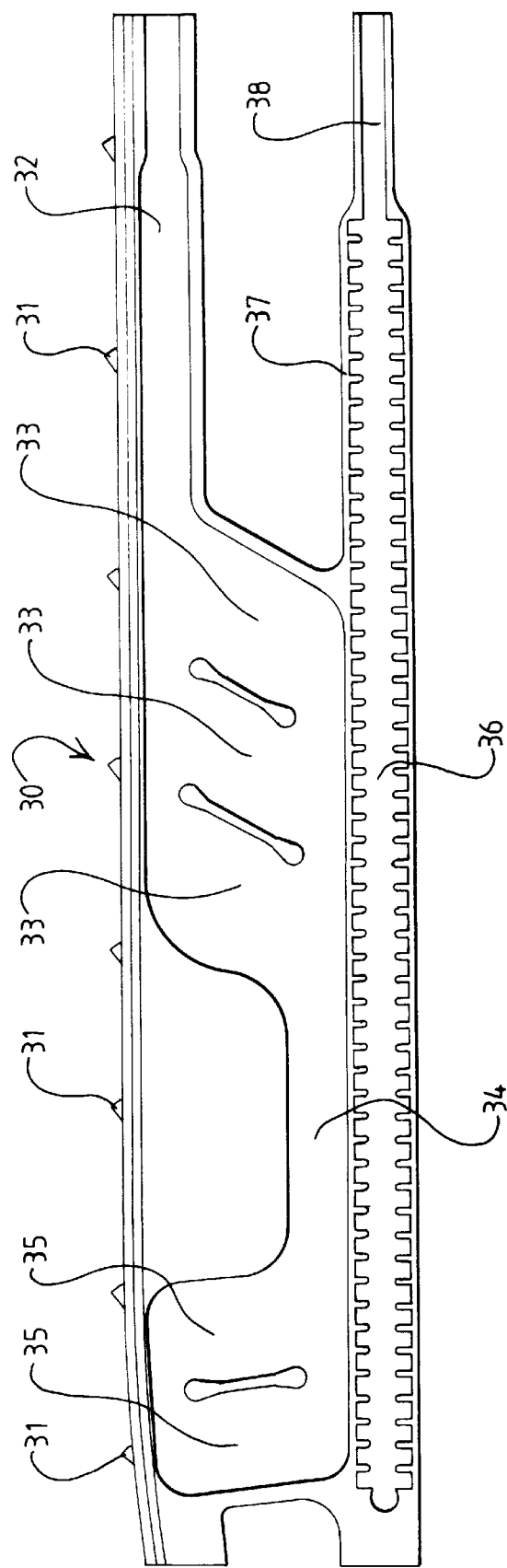
FIG_10

AIR-BAG ARRANGEMENT

BACKGROUND OF THE INVENTION

THIS INVENTION relates to an air-bag arrangement, and more particularly relates to an air-bag arrangement in a motor vehicle such as a motor car.

It is known to provide air-bags in motor vehicles, such as motor cars, which air-bags are adapted to inflate in the event that an accident should arise, to provide protection for an occupant of the vehicle.

It has been proposed to provide an air-bag which, when inflated, is located between the head and upper thorax of an occupant of the vehicle and the roof frame, and at least the "A" and "B"—Post and the door, together with a window present in the door of the vehicle. The air-bag may also extend adjacent the side of the vehicle by the rear seat to the "C"—Post. The purpose of such an air-bag is to prevent the head of the occupant of the vehicle hitting the window and also to prevent the head of the occupant from emerging through the window opening if the window should be broken, or in the lowered position.

If the air-bag is to perform the desired function of retaining the head of the occupant in the vehicle when the window has been broken, an event which frequently arises during a side impact, or if the window is open, then the air-bag must have sufficient rigidity so that the air-bag is not itself forced out of a broken or open window. A particular problem arises in ensuring that a lower edge of such an air-bag is sufficiently rigid to prevent the air-bag being pushed out through a window during an accident.

SUMMARY OF THE INVENTION

Accordingly, the present invention provides an air-bag arrangement for a motor vehicle, the air-bag arrangement comprising an inflatable element, at least a part of which is adapted to be inflated, in the event that an accident should arise, so that the element is then located to form a side curtain, the inflatable element having at least one fixation strap extending between a lower region of the side curtain and an anchor point, the fixation strap having inflatable means to shorten the effective length of the fixation strap upon inflation to increase the rigidity of the inflatable element.

It is to be appreciated that an air-bag arrangement of this type may be initially mounted in position in a motor vehicle in a non-linear housing or recess. Thus preferably an edge of the inflatable element is connected to a non-linear part of a motor vehicle extending over the door opening of the vehicle. The housing or recess may extend along the roof frame contour. Fixation points for the air-bag may be provided at opposed ends of the non-linear housing or recess, and the arrangement may be such that when the air-bag is inflated, the lower edge of the air-bag is to extend tightly in a linear fashion between these two fixing points. Thus, the combination of the air-bag and the fixation strap must be longer, in the uninflated state, than the linear distance between the fixation points, since the distance within the housing or recess, along the roof contour, is longer than the straight-line distance between the fixation points.

In one embodiment the inflatable means comprises a single inflatable pocket.

Alternatively, the inflatable means comprises a plurality of inflatable pockets.

Desirably, the pockets are serially connected to one another.

In one embodiment the fixation strap comprises a strap woven around alternate sides of the pockets such that the strap is substantially linear when the pockets are in a flat and uninflated state and in a non-linear form when the pockets are inflated thereby shortening the effective length of the fixation strap.

Conveniently, the inflatable means is in gas communication with the inflatable element and a single gas generator is provided to inflate the inflatable element and the inflatable means.

Alternatively the inflatable means is not in gas communication with the rest of the inflatable element and separate gas generator means are provided for the inflatable element and the inflatable means.

Desirably, the air-bag comprises a plurality of substantially parallel cells.

Advantageously, a central section of the curtain formed by the inflation of the inflatable element is not formed with cells but is provided with one or more inflatable ribs such that the central section of the curtain is substantially not inflated.

Preferably, the fixation strap has a fixing eye for attachment to an anchor point.

Preferably the duct has an extension that extends to and is formed integrally with the fixation strap.

Conveniently the integrally formed part of the duct extension and the fixation strap is provided with a fixing eye.

The arrangement may be provided with two of said fixation straps, the fixation straps being located at opposite ends of said curtain.

BRIEF DESCRIPTION OF THE DRAWINGS

FIG. 1 is a sectional side view of one embodiment of the invention when the inflatable element is in a flat and unpacked state;

FIG. 2 is a view from above of the embodiment of FIG. 1 in an uninflated and packed state;

FIG. 3 illustrates a motor vehicle in which the inflatable element is installed;

FIG. 4 is a sectional side view of the embodiment shown in FIG. 1 when the inflatable element is in an installed and inflated state;

FIG. 10 is a view of a further alternative embodiment of the invention.

DESCRIPTION OF THE PREFERRED EMBODIMENTS

Figure 5:
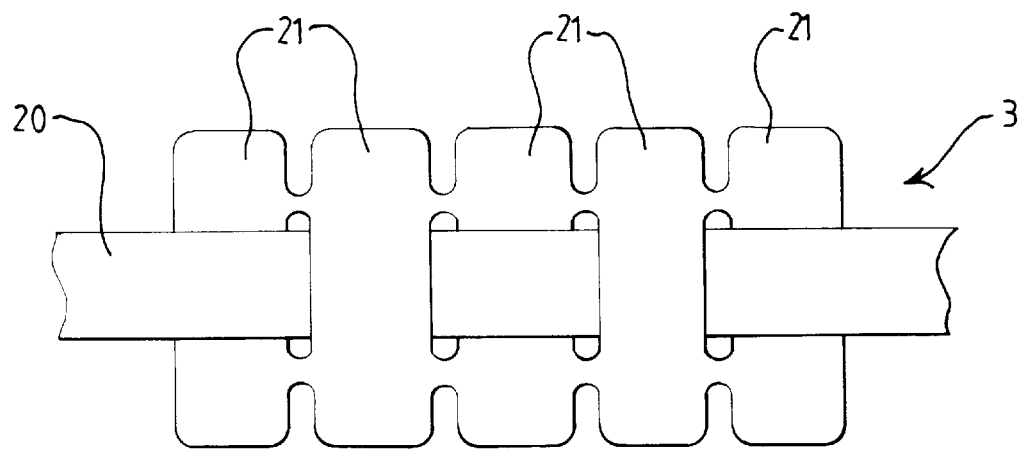
FIG. 5 is a side view of a section of a fixation strap for use with the present invention.

In order that the invention may be more readily understood, and so that further features thereof may be appreciated, the invention will now be described, by way of example, with reference to the accompanying drawings.

An air-bag arrangement embodying the present invention is intended to provide protection for a person sitting in a seat in a motor vehicle. In any accident in which the vehicle is decelerated the driver or front-seat passenger will tend to move forwardly towards the steering wheel or dashboard, but will be restrained by a conventional seat belt or air-bag. In the case of a side impact or rollover, there is a risk that the head or upper thorax of the driver or occupant will strike the adjacent window in the door, or strike the B-post, or the roof frame. There is also a risk that if, as most commonly happens, the glass in the window should break, the head of the person may be thrown out of the window, especially in the case of roll-over. A similar problem will be experienced by a rear seat passenger.

The air-bag arrangement comprises a gas generator which is adapted to generate gas, such as cold gas. The gas generator incorporates, or is associated with, a sensor which senses a side impact and/or a roll-over situation to activate the gas generator at an appropriate instant. The gas generator is connected, to an inflatable element. The inflatable element may be made of interwoven fabric. Thus the element maybe made of super-imposed layers of fabric, with threads from the warp and weft of the upper layer being inter-woven with threads form the warp and weft of the lower layer in selected regions to form seams that inter-connect the upper and lower layers of fabric.

Referring to FIG. 1 in which the inflatable element of the air-bag arrangement is shown in a flat and uninflated state, the inflatable element comprises two super-imposed layers of fabric, regions of which are connected, for example, by inter-weaving the threads of the two layers, to define a linear, substantially horizontally extending gas duct 1, to which a gas generator is to be connected, and a plurality of parallel substantially vertical, substantially cylindrical cells 2 defining a curtain. The cells extend substantially transversely to the lower edge of the inflatable element. The inflatable element also comprises an integrally formed fixation strap 3 which extends from a lower region of the part of the air-bag which, when inflated, forms the curtain, and which includes a plurality of serially connected pockets 4 leading off from the lower part of one of the cells 2. The fixation strap 3 projects from a lower region of the curtain and terminates with a fixing eye 5.

The duct 1 communicates with each of the cells 2 to allow gas from the gas generator to inflate the cells 2 to form the curtain. The duct 1 ends in an extension or spur 6 which is provided, at its end, with a further fixing eye 7. The spur 6 projects from the air-bag in substantially the same direction as the fixation strap 3. The spur 6 and the fixation strap 3 are of substantially the same length and therefore both terminate at substantially the same distance from the air-bag.

At the end of the inflatable element remote from the strap 3, at the lower edge of the inflatable element there is a fixation eye 8.

The inflatable element is initially packed in a substantially flat and uninflated condition as shown in FIG. 2.

The packed air-bag arrangement is inserted in a non-linear housing or recess 10, as shown in FIG. 3 which extends along the roof frame across the top of the door opening 11, 12, and part way down the "A"—Post 13 of a motor vehicle, the housing or recess being provided with a cover. In an initial condition of the air-bag arrangement, the uninflated and packed air-bag is received within the housing or recess and is covered by the cover so as to be unobtrusive. The upper edge of the inflatable element, that is the part which defines the duct 1 is fixed along its length to a non-linear part of the recess and the fixing eyes 5,7 of, respectively, the fixation strap 3 and the spur 6 of the duct 1 are co-aligned and fixed to an anchor point by their respective fixing eyes in the recess or housing. The fixation eye 8 is also connected to an anchor point, or to a further strap.

Since the front area of the door frame, i.e. the "A"—Post, is angled downwardly with respect to the upper area of the door frame, the packed air-bag and, in particular, the fixation strap 3 and the spur 6 of the duct 1 are bent with respect to the rest of the packed air-bag so as to conform to the shape of the recess in the door frame.

When inflated, as shown in FIG. 4, the duct 1 remains in the recess and the cells 2 depend from the duct to create an inflated rigid side curtain which substantially covers at least the upper part of the window. The fixation strap 3 extends from the anchor point in the recess to a lower edge of the curtain in a substantially horizontal orientation. FIG. 4 shows fixing lugs 14 provided at the upper edge of the inflatable element to secure it to a non-linear part of the housing or recess.

Comparing the inflatable element in its flat and unpacked condition as shown in FIG. 1 to its installed and inflated condition shown in FIG. 4, it can be seen that, since the duct 1 remains located in the recess upon inflation of the inflatable element, the fixation strap 3 which extends from the same anchor point as the spur 6 of the duct 1 would not be taut, with the cells 2 of the inflatable element creating the side curtain, between the anchor points. Indeed, it has been found that there is approximately between 30 to 60 mm of slack in the fixation strap 3 which needs to be taken up in order for the lower edge of the inflatable element to be sufficiently rigid to prevent the inflatable element from being forced out of the broken window during an accident.

To ensure that the lower edge of the inflatable element is sufficiently rigid, the fixation strap 3 is provided with the plurality of serially connected pockets 4 which are in gas communication with one another and the inflatable cells 2. Thus, when the inflatable element is inflated, not only do the cells 2 inflate but so do the pockets 4 in the fixation strap 3. As the pockets 4 inflate, the opposed side walls of each pocket bulge outwardly and the effective length of the fixation strap 3 is shortened to take up the slack in the fixation strap 3 so that the lower edge of the inflatable element is sufficiently rigid to prevent the inflatable element from being pushed out through a broken window during an accident. The inflated spur 6 is substantially aligned with the "A"—Post, and will prevent the head of the driver or front-seat passenger from striking the "A"—Post.

It is to be observed that the central section of the inflatable element is not formed with cells 2 but is provided with a pair of inflatable ribs 9 which depend from the duct 2 such that the central section of the curtain is substantially not inflated but is held taut between the cells at either end of the air-bag. The region provided with the ribs 9 will be located, when the curtain is inflated, just behind the "B"—Post 15 of the motor vehicle. Thus, the front part of the inflatable element will prevent the head of the driver or front-seat occupant passing through the window or striking the "B"—Post, whereas the rear part of the inflatable element will protect the head of a rear-seat-occupant of the vehicle. Since the part provided with the ribs 9 will not protect the head of either occupant, this part of the inflatable element is not provided with large inflatable cells to minimise the amount of gas required to fully inflate the inflatable element.

FIGS. 1 and 4 show only one version of the arrangement of the pockets 4 in the fixation strap 3. In other embodiments of the present invention, the inflation strap 3 may itself comprise a single cell which is inflatable, the length of the fixation strap 3 shortening with inflation of that cell, as a consequence of the orientation of the warp and weft of the fabric forming the cells. The warp and weft should each make an angle of approximately 45° to the axis of the strap 3.

Figure 6:
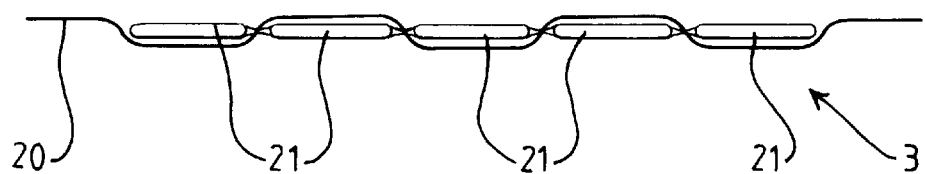
FIG. 6 is a sectional view from above of the strap of FIG. 5 in an uninflated state.
Figure 7:
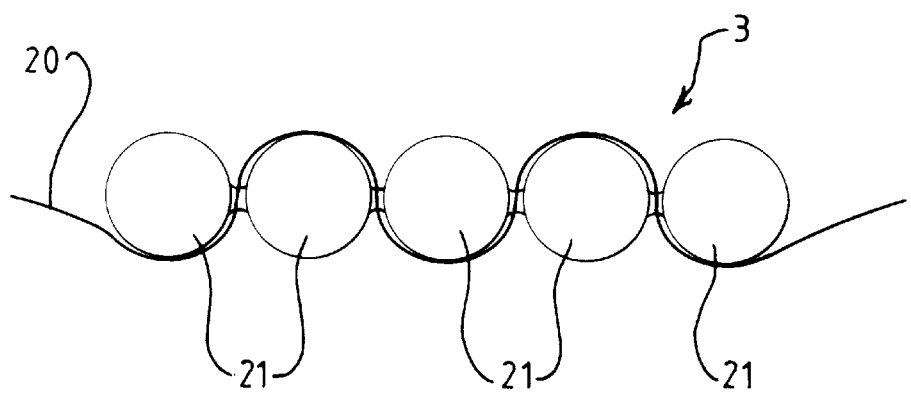
FIG. 7 is a sectional view from above of the strap of FIG. 5 in an inflated state.

In another embodiment, illustrated in FIGS. 5, 6 and 7, the fixation strap 3 could comprise a length of webbing 20 woven around alternate sides of a series of inflatable cylindrical cells or pockets 21 such that the webbing 20 is substantially linear when the cells 11 are in a flat and uninflated state as shown in FIGS. 4 and 5. However, inflation of the cells 21 causes the webbing 20 to take on a non-linear form and, indeed, a semi-circular wave form profile, thereby shortening the effective length of the fixation strap 3 as shown in FIG. 7.

Figure 8:
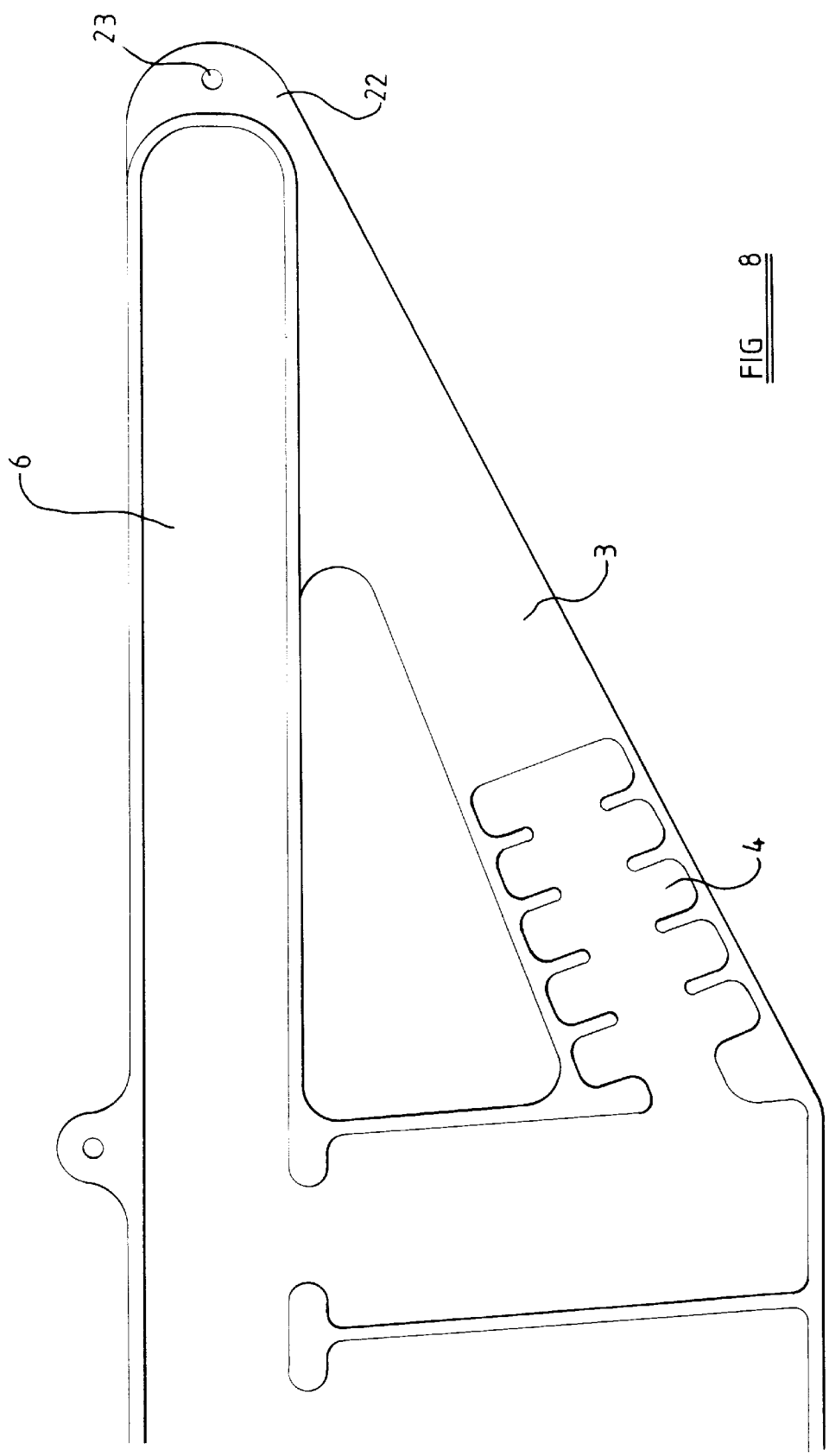
FIG. 8 is a partial sectional side view of a modified embodiment of the invention.

FIG. 8 illustrates a modified embodiment of the invention in which the duct 6 and the fixation strap 3, which is provided with the serially connected pockets 4, have an integrally formed terminating region 22, where the fabric forming the inflatable element that defines the duct 6 actually constitutes the end of the fixation strap 3. The region 22 is provided with a fixation eye 23.

Figure 9:
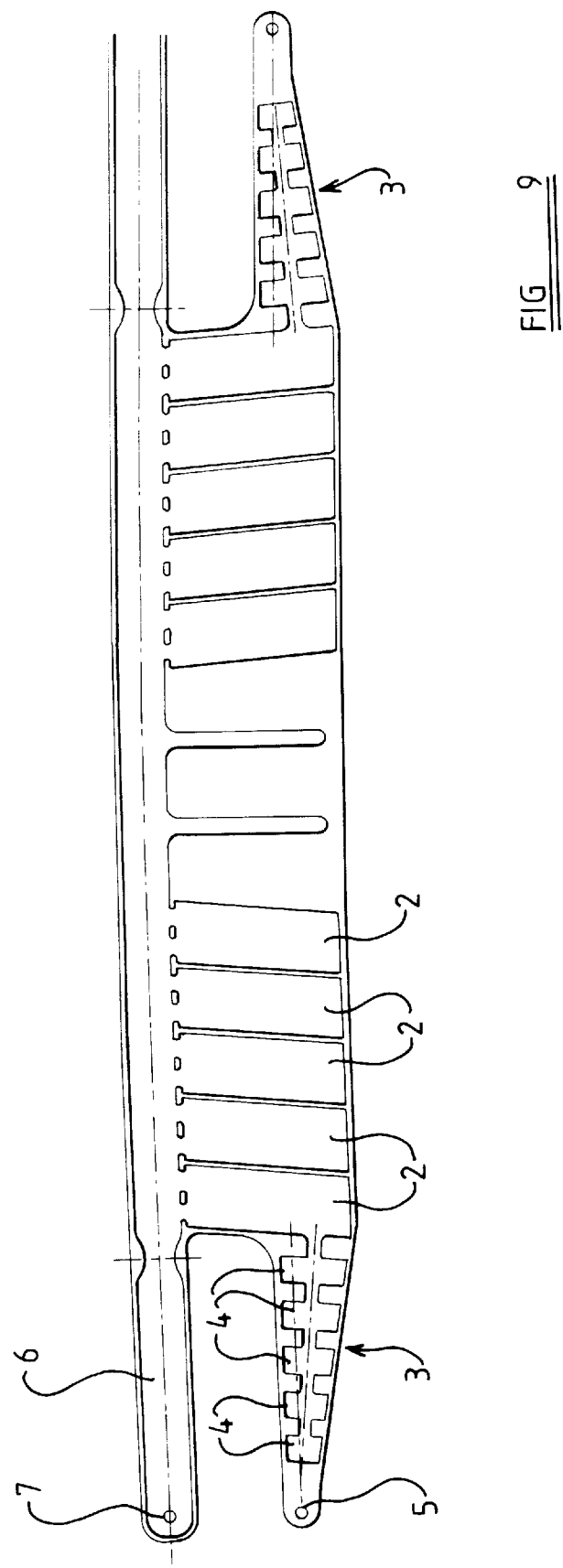
FIG. 9 is a view corresponding to FIG. 1 of another embodiment of the invention.

FIG. 9 illustrates a further modified embodiment of the invention in which each end of the inflatable element is provided with a respective fixation strap 3. At one end of the bag the duct extension 6 is provided, whereas the other end of the inflatable element is merely provided with part of the duct 1 which extends to a gas generator.

It is envisaged that an air-bag arrangement of the type illustrated in FIG. 8 may be utilised to provide protection along the entire side of a motor vehicle, with the duct 6 being positioned so that, when the inflatable element is inflated, it is located adjacent the "A"—Post, and with the part of the duct that extends to the gas generator (as shown on the right-hand side of FIG. 8) being located adjacent the "C"—Post of the motor vehicle.

FIG. 10 illustrates a further inflatable element 30 comprising another embodiment of the invention. The inflatable element 30 is formed from two super-imposed layers of fabric, parts of the layers of fabric being inter-connected, for example by inter-weaving the warp and weft threads of the fabric, so that the fabric defines various regions within the inflatable element.

The upper edge of the inflatable element 30 is provided with a plurality of lugs 31 by means of which the inflatable element may be secured to a non-linear recess or housing located above the door opening of a motor vehicle.

One part of the inflatable element defines a gas supply duct 32 which extends, at one side of the inflatable element, adjacent the upper edge provided with the lugs 31. The gas duct 32 initially communicates with three cells 33, which extend at a slight inclination to the vertical. The lower edges of the cells 33 is connected with a further gas duct 34 which extends adjacent the lower edge of the inflatable element to a further pair of inflatable cells 35, which again extend at a slight angle to the vertical.

The entire lower edge of the inflatable element comprises an elongate chamber 36 which is formed to be a plurality of adjacent pockets or cells which are in inter-communication with each other. The chamber 36 extends into a fixation strap 37 which extends from the inflatable element, the fixation strap terminating with a further gas supply duct 38. The gas supply duct 32 may be connected to one gas generator and the supply gas duct 38 may be connected to another gas generator.

The inflatable element illustrated in FIG. 10 would be mounted, using mounting eyes and lugs generally as described with reference to the preceding embodiments, in a non-linear housing or recess located above the door openings in a motor vehicle. In the event that an accident should occur, gas will be supplied, by one gas generator, to the gas duct 32, and by another gas generator, to the gas duct 38. The cells 33 and 35 will thus inflated, tending to provide a substantially rigid side curtain. The individual pockets within the chamber 36 will be inflated, thus effectively shortening the length of the fixation strap 37 and also effectively shortening the lower edge of the entire inflatable element. Consequently, the entire inflatable element will constitute a substantially rigid side curtain located adjacent the window openings provided in the doors of the motor vehicle.

What is claimed is:

1. An air-bag arrangement for a motor vehicle, the air-bag arrangement comprising an inflatable element, at least a part of which is adapted to be inflated, in the event that an accident should arise, so that the element is then located to form a side curtain, the inflatable element having at least one fixation strap extending between a lower region of the side curtain and an anchor point, the fixation strap having inflatable means to shorten the effective length of the fixation strap upon inflation to increase the rigidity of the inflatable element.

2. An air-bag arrangement according to claim 1 wherein an edge of the inflatable element is connected to a non-linear part of a motor vehicle extending over the door opening of the vehicle.

3. An air-bag arrangement according to claim 1, wherein the inflatable means comprises a single inflatable pocket.

4. An air-bag arrangement according to claim 1, wherein the inflatable means comprises a plurality of inflatable pockets.

5. An air-bag arrangement according to claim 4, wherein the pockets are serially connected to one another.

6. An air-bag arrangement according to claim 4, wherein the fixation strap comprises a strap extending around alternate sides of the pockets such that the strap is substantially linear when the pockets are in a flat and uninflated state and in a non-linear form when the pockets are inflated thereby shortening the effective length of the fixation strap.

7. An air-bag arrangement according to claim 1, wherein the inflatable means is in gas communication with the inflatable element and a single gas generator is provided to inflate the inflatable element and the inflatable means.

8. An air-bag arrangement according to claim 1, wherein the inflatable means is not in gas communication with the rest of the inflatable element, and separate gas generator means are provided for the inflatable element and the inflatable means.

9. An air-bag arrangement according to claim 1, wherein the inflatable element comprises a plurality of substantially parallel cells.

10. An air-bag arrangement according to claim 9, wherein a central section of the curtain formed by the inflation of the inflatable element is not formed with cells but is provided with one or more inflatable ribs such that the central section of the curtain is substantially not inflated.

11. An air-bag arrangement according to claim 1, wherein the fixation strap has a fixing eye for attachment to an anchor point.

12. An air-bag arrangement according to claim 1 wherein the duct has an extension that extends to and is formed integrally with the fixation strap.

13. An air-bag arrangement according to claim 12 wherein the integrally formed part of the duct extension and the fixation strap is provided with a fixing eye.

14. An air-bag arrangement according to claim 1 provided with two of said fixation straps, the fixation straps being located at opposite ends of said curtain.

15. An air-bag arrangement according to claim 1 wherein at least part of the lower edge of the inflatable element comprises an elongate chamber formed of a plurality of adjacent pockets or cells which are intercommunication with each other, said pockets or cells being adapted to be inflated upon inflation of the inflatable element.

16. An air-bag arrangement according to claim 15 wherein the fixation strap and said chamber comprise an integral part of the air-bag arrangement, the pockets or cells within the chamber being in communication with the pocket or pockets within the fixation strap.

17. An air-bag arrangement according to claim 15 wherein the said chamber extends across the entire lower edge of the inflatable element, the fixation strap being provided with means to connect the fixation strap to an anchoring point and the end of the chamber, remote from the fixation strap, being provided with means to connect that end of the chamber to an anchoring point.

* * * * *